United States Patent Office 3,183,227
Patented May 11, 1965

3,183,227
AMINOALKYL 3β,17β-DIHYDROXYANDROST-5-EN-17α-YLPROPIOLATES AND 3-OXO-5-ENES CORRESPONDING
Robert W. Hamilton, Wilmette, and Kurt J. Rorig, Glenview, Ill., assignors to G. D. Searle & Co., Chicago, Ill., a corporation of Delaware
No Drawing. Filed Sept. 17, 1963, Ser. No. 309,400
9 Claims. (Cl. 260—239.5)

This invention relates to aminoalkyl 3β,17β-dihydroxyandrost-5-en-17α-ylpropiolates, 3-oxo-5-enes corresponding, and processes for the manufacture thereof. More particularly, this invention provides new, useful, and unobvious chemical compounds of the formula

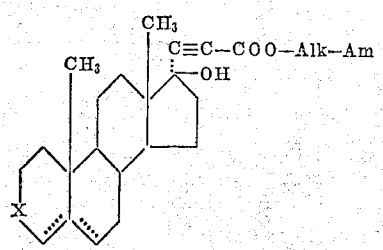

wherein X represents a β-hydroxymethylene or carbonyl radical, alk represents an alkylene radical, Am represents an optionally-alkylated amino radical, and the dotted line represents a 4(5) or 5(6) double bond.

Among the alkylene radicals represented by Alk in the foregoing formula, especially lower alkylene radicals are preferred, for example, ethylene, trimethylene, propylene, tetramethylene, 2-methyl-1,2-propylene, pentamethylene, 2,2-dimethyl-1,3-propylene, and like bivalent, saturated, acyclic, straight- or branched-chain, hydrocarbon groupings having the formula

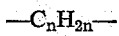

wherein $n$ represents a positive integer less than 8.

Am in the generic formula for compounds of this invention subsumes both the primary amino radical, —NH$_2$, and secondary and most advantageously tertiary amino radicals resulting from the substitution of 1 or 2 alkyl radicals, respectively, for hydrogen therein—especially lower alkyl radicals, such as methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings having the formula

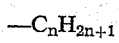

wherein $n$ represents, as before, a positive integer less than 8. The alkyl groupings present when Am designates a tertiary amino radical may either be discrete, thus

or they may be joined together directly or through oxygen or a second nitrogen atom to compose cyclic amino radicals. Representative of cyclic amino radicals contemplated by Am are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino and like monovalent, 5- and 6-membered heterocyclic groupings. The terminal "ino" in the radical names set forth denotes attachment of the radicals thus characterized via nitrogen.

Equivalent to the foregoing basic esters of this invention for the purposes here disclosed are non-toxic acid addition salts thereof, the compositions of which may be symbolized by

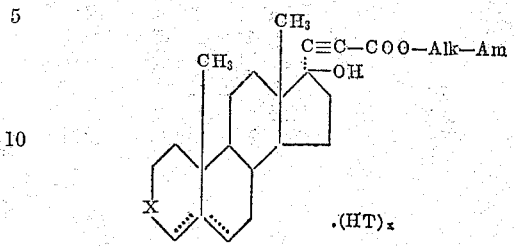

wherein X, Alk, Am, and the dotted line retain the meanings previously assigned; T represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and $x$ represents a positive integer less than 3.

The compounds to which this invention relates are useful because of their valuable pharmacological properties. Thus, for example, they are anti-hypertensive and, as evidenced by their capacity to reduce the heat, swelling, and rubor characteristic of the inflammatory response to tissue insult, anti-inflammatory.

Manufacture of the basic esters hereof proceeds by heating an appropriate acid of the formula

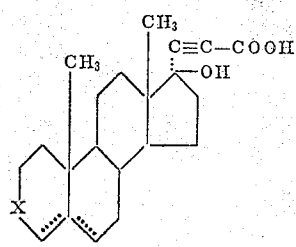

and aminoalkyl halide of the formula

in the presence of an inert solvent, such as a lower alkanol. (The meanings of X, Alk, Am, and the dotted line are the same as before.)

Conversion of the basic esters of the invention to corresponding acid addition salts is accomplished by simple admixture thereof with 1 or 2 equivalents of any of various inorganic and strong organic acids, the anionic portion of which conforms to T as hereinbefore assigned.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *2-dimethylaminoethyl 3β,17β-dihydroxyandrost-5-en-17α-ylpropiolate hydrochloride.*—A mixture of 100 parts of 3β,17β-dihydroxyandrost-5-en-17α-ylpropiolic acid (preparable by the procedure of Example 1A in U.S. 2,705,712), 34 parts of dimethylaminoethyl chloride, and 4000 parts of absolute 2-propanol is heated at the boiling point under reflux in an atmosphere of nitrogen for 3 hours, whereupon solvent is removed by vacuum distillation. The residue is taken up in 900 parts of 90% ethanol and the resultant solution precipitated with 1600 parts of anhydrous ether. The precipitate, filtered off and twice reprecipitated from 90% ethanol with anhydrous ether, affords 2-dimethylaminoethyl 3β,17β-dihydroxyandrost-5-en-17α-ylpropiolate hydrochloride melting at approximately 255° with gas evolution. The product has the formula

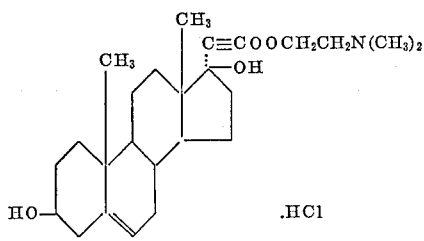

B. *2 - dimethylaminoethyl 3β,17β-dihydroxyandrost-5-en-17α-ylpropiolate.*—Approximately 10 parts of 2-dimethylaminoethyl 3β,17β-dihydroxyandrost-5-en-17α-ylpropiolate hydrochloride is partitioned between aqueous potassium carbonate and chloroform. The chloroform phase is separated, washed with water, and stripped of solvent by vacuum distillation. The residue is 2-dimethylaminoethyl 3β,17β-dihydroxyandrost-5-en-17α-ylpropiolate.

*Example 2*

*2-diethylaminoethyl 3β,17β-dihydroxyandrost-5-en-17α-ylpropiolate hydrochloride.*—A mixture of 300 parts of 3β,17β-dihydroxyandrost-5-en-17α-ylpropiolic acid, 113 parts of diethylaminoethyl chloride, and 4000 parts of absolute 2-propanol is heated at the boiling point under reflux for 3 hours. The solvent is thereupon distilled off under reduced pressure and the residue taken up in 8000 parts of absolute ethanol. To the ethanol solution is added just sufficient 2-propanolic hydrogen chloride to insure acidity, followed by 16,000 parts of anhydrous ether. The 2-diethylaminoethyl 3β,17β-dihydroxyandrost-5-en-17α-ylpropiolate hydrochloride which crystallizes out melts at 204–209° with gas evolution. The product has the formula

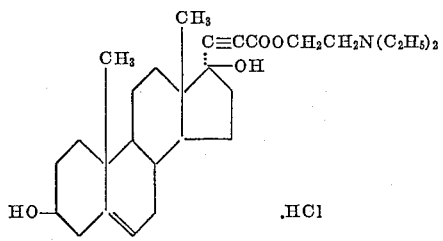

*Example 3*

*2-diethylaminoethyl 17β-hydroxy - 3 - oxoandrost-4-en-17α-ylpropiolate hydrochloride.*—A mixture of 30 parts of 17β-hydroxy-3-oxoandrost-4-en-17α-ylpropiolic acid (preparable from the product of Example 1A in U.S. 2,705,712 by Oppenauer oxidation as taught at lines 44–51 of column 4 therein), 13 parts of diethylaminoethyl chloride, and 450 parts of 2-butanol is heated at the boiling point under reflux for 16 hours, whereupon solvent is stripped by vacuum distillation. The residue is taken up in 200 parts of absolute ethanol, and the ethanol solution is diluted with 200 parts of anhydrous ether. A small amount of precipitate is filtered off and discarded. To the filtrate is added 400 parts of anhydrous ether. The resultant precipitate is 2-diethylaminoethyl 17β-hydroxy-3-oxoandrost-4-en-17α-ylpropiolate hydrochloride which, filtered off and dried in air, melts at approximately 180° with gas evolution. The product has the formula

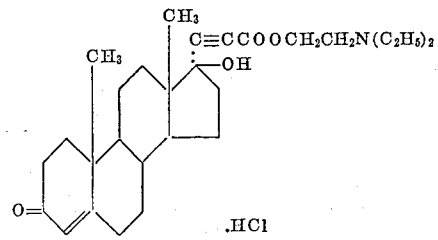

*Example 4*

*3 - dimethylaminopropyl 3β,17β - dihydroxyandrost-5-en-17α-ylpropiolate hydrochloride.*—A mixture of 30 parts of 3β,17β-dihydroxyandrost - 5 - en-17α-ylpropiolic acid, 11 parts of 3-dimethylaminopropyl chloride, and 2000 parts of absolute 2-propanol is heated at the boiling point under reflux for 16 hours. Just sufficient solvent is removed by vacuum distillation to induce the formation of a precipitate. The precipitate is filtered off and discarded. The filtrate is stripped of solvent by vacuum distillation and the residue taken up in 800 parts of absolute ethanol. To the ethanol solution is added 800 parts of anhydrous ether. The precipitate which forms is filtered off and recrystallized from absolute ethanol and anhydrous ether to give 3-dimethylaminopropyl 3β,17β-dihydroxyandrost - 5 - en-17α-ylpropiolate hydrochloride melting at 232–236° with gas evolution. The product has the formula

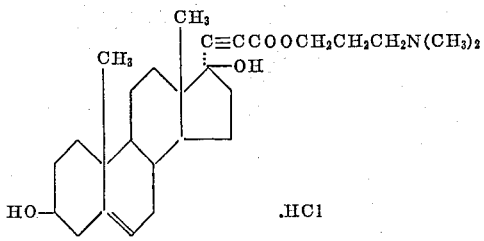

*Example 5*

*3-dimethylaminopropyl 17β - hydroxy-3-oxoandrost-4-en-17α-ylpropiolate hydrochloride.*—A mixture of 50 parts of 17β-hydroxy-3-oxoandrost-4-en-17α-ylpropiolic acid, 19 parts of 3-dimethylaminopropyl chloride, and 600 parts of anhydrous 2-butanol is heated at the boiling point under reflux for 16 hours. Solvent is removed by vacuum distillation. The residue is taken up in absolute ethanol. The ethanol solution is precipitated with anhydrous ether. The precipitate is filtered off and dried in air. The product thus isolated is 3-dimethylaminopropyl 17β - hydroxy-3-oxoandrost-4-en-17α-ylpropiolate hydrochloride, having the formula

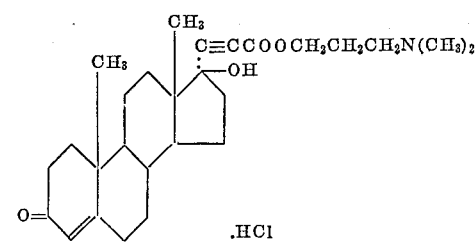

*Example 6*

*2-pyrrolidinoethyl 3β,17β - dihydroxyandrost-5-en-17α-ylpropiolate hydrochloride.*—A mixture of 12 parts of 3β,17β - dihydroxyandrost - 5 - en - 17α-ylpropiolic acid, 5 parts of N-(2-chloroethyl)pyrrolidine, and 500 parts of absolute 2-propanol is heated at the boiling point under reflux for 16 hours. The reaction mixture is then cooled to 0°, whereupon the precipitate which forms is filtered off and taken up in a minimum amount of hot absolute ethanol. To the hot ethanol solution is added sufficient anhydrous ether to bring about incipient precipitation. The precipitate thrown down on cooling is filtered off and recrystallized from a mixture of aqueous 80% ethanol and ether to give 2-pyrrolidinoethyl 3β,17β-dihydroxyandrost-5-en-17α-ylpropiolate hydrochloride. The product starts to melt and darkens at 253°, with melting being completed at 280° or above, depending upon the rate of heating. The product has the formula

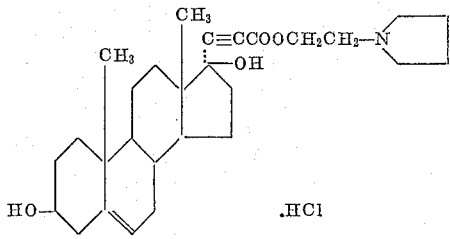

*Example 7*

3 - piperidinopropyl 3β,17β - dihydroxyandrost - 5-en-17α-ylpropiolate hydrochloride.—A mixture of 100 parts of 3β,17β-dihydroxyandrost - 5 - en-17α-ylpropiolic acid, 51 parts of N-(3-chloropropyl)piperidine, and 800 parts of absolute 2-propanol is heated at the boiling point under reflux for 3 hours. Solvent is removed by vacuum distillation. The residue is taken up in absolute ethanol, and the ethanol solution is precipitated with anhydrous ether. The precipitate thrown down is filtered off and dried in air. The product thus isolated is 3-piperidinopropyl 3β,17β - dihydroxyandrost-5-en-17α-ylpropiolate hydrochloride, having the formula

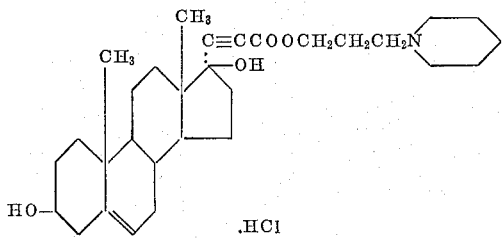

*Example 8*

3 - piperidinopropyl 17β - hydroxy - 3 - oxoandrost - 4 - en - 17α - ylpropiolate hydrochloride.—A mixture of 30 parts of 17β-hydroxy-3-oxoandrost-4-en-17α-ylpropiolic acid, 15 parts of N-(3-chloropropyl)piperidine, and 400 parts of absolute 2-butanol is heated at the boiling point under reflux for 16 hours. Solvent is thereupon removed by vacuum distillation and the residue taken up in absolute ethanol. Sufficient anhydrous ether is added to the ethanol solution to precipitate 3-piperidinopropyl 17β - hydroxy - 3 - oxoandrost - 4 - en - 17α - ylpropiolate hydrochloride, which is recovered on a filter and dried in air. The product thus isolated has the formula

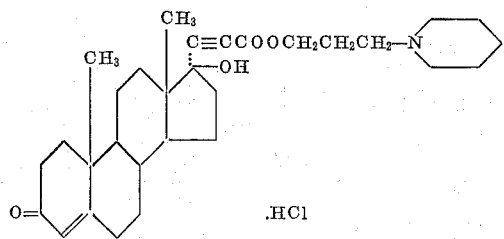

What is claimed is:
1. A compound of the formula

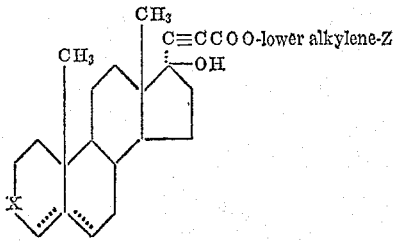

wherein X represents a member of the class consisting of β-hydroxymethylene and carbonyl radicals, the lower alkylene radical called for separates the groups attached thereto by at least 2 carbon atoms, Z represents a member of the class consisting of di(lower alkyl)amino, pyrrolidino, and piperidino radicals, and the dotted line represents a 5(6) double bond when X represents a β-hydroxymethylene radical and a 4(5) double bond when X represents a carbonyl radical.

2. A compound of the formula

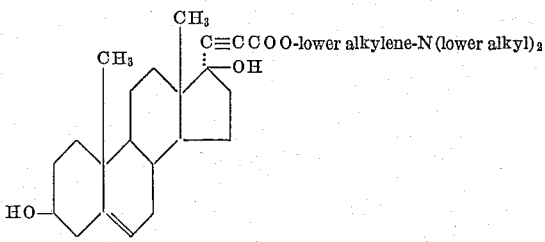

wherein the lower alkylene radical called for separates the groups attached thereto by at least 2 carbon atoms.

3. 2 - dimethylaminoethyl 3β,17β - dihydroxyandrost-5 - en - 17α - ylpropiolate.

4. 2 - dimethylaminoethyl 3β,17β - dihydroxyandrost-5 - en - 17α - ylpropiolate.

5. 3 - dimethylamino propyl 3β,17β - dihydroxyandrost - 5 - en - 17α - ylpropiolate.

6. A compound of the formula

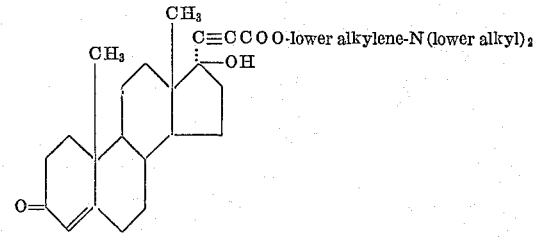

wherein the lower alkylene radical called for separates the groups attached thereto by at least 2 carbon atoms.

7. 2 - diethylaminoethyl 17β - hydroxy - 3 - oxoandrost - 4 - en - 17α - ylpropiolate.

8. A compound of the formula

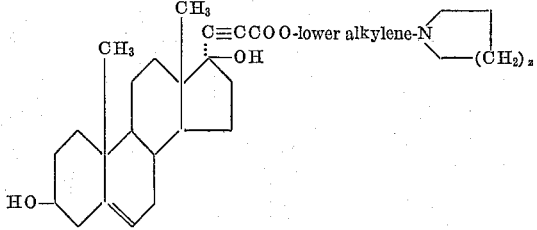

wherein the lower alkylene radical called for separates the groups attached thereto by at least 2 carbon atoms and z represents a positive integer less than 3.

9. 2 - pyrrolidinoethyl 3β,17β - dihydroxyandrost-5-en-17α-ylpropiolate.

No references cited.

LEWIS GOTTS, *Primary Examiner.*

UNITED STATES PATENT OFFICE
CERTIFICATE OF CORRECTION

Patent No. 3,183,227                        May 11, 1965

Robert W. Hamilton et al.

It is hereby certified that error appears in the above numbered patent requiring correction and that the said Letters Patent should read as corrected below.

Column 6, line 38, for "2-dimethylaminoethyl" read -- 2-diethylaminoethyl --; column 6, line 40, for "3-dimethylamino propyl" read -- 3-dimethylaminopropyl --.

Signed and sealed this 28th day of June 1966.

(SEAL)
Attest:

ERNEST W. SWIDER
Attesting Officer

EDWARD J. BRENNER
Commissioner of Patents